US009558713B2

(12) United States Patent
Jureidini et al.

(10) Patent No.: US 9,558,713 B2
(45) Date of Patent: Jan. 31, 2017

(54) DYNAMIC TRANSPARENCY ADJUSTMENT OF USER INTERFACE ELEMENT

(71) Applicant: Google Inc., Mountain View, CA (US)

(72) Inventors: Imad Jureidini, Arlington, MA (US); Jokubas Zukerman, San Francisco, CA (US)

(73) Assignee: Google Inc., Mountain View, CA (US)

( * ) Notice: Subject to any disclaimer, the term of this patent is extended or adjusted under 35 U.S.C. 154(b) by 387 days.

(21) Appl. No.: 14/132,271

(22) Filed: Dec. 18, 2013

(65) Prior Publication Data

US 2015/0170606 A1 Jun. 18, 2015

(51) Int. Cl.
*G09G 5/02* (2006.01)
*G06F 3/147* (2006.01)

(52) U.S. Cl.
CPC ............. *G09G 5/026* (2013.01); *G06F 3/1475* (2013.01); *G09G 2340/06* (2013.01); *G09G 2340/10* (2013.01)

(58) Field of Classification Search
CPC ... G09G 5/02; G09G 2340/10; G06T 2210/62; G06F 2203/04804; G06F 3/0481
See application file for complete search history.

(56) References Cited

U.S. PATENT DOCUMENTS

| 6,118,427 | A | 9/2000 | Buxton et al. | |
|---|---|---|---|---|
| 7,573,487 | B1 * | 8/2009 | Petersen | G06F 3/04817 345/592 |
| 8,743,136 | B2 * | 6/2014 | Besley | G06T 1/00 345/589 |
| 8,997,017 | B2 * | 3/2015 | Stecher | G06F 3/0481 715/759 |
| 2006/0059432 | A1 * | 3/2006 | Bells | G06F 3/0481 715/768 |
| 2010/0073401 | A1 * | 3/2010 | Zaklika | G06T 5/00 345/619 |
| 2014/0009487 | A1 * | 1/2014 | Mizuno | G06T 15/503 345/592 |

* cited by examiner

*Primary Examiner* — Antonio A Caschera
(74) *Attorney, Agent, or Firm* — Fenwick & West LLP

(57) ABSTRACT

A user device dynamically adjusts one or more portions of a user interface (UI) element. The user device detects content color data describing the color of content that is overlaid by a UI element on a display of a user device, the UI element including one or more components and a UI element background. The user device determines component color data describing the color of the one or more components of the UI element, and dynamically determines transparency data for the UI element background using the content color data and the component color data. The user device displays the UI element in accordance with the transparency data and the component color data.

19 Claims, 5 Drawing Sheets

DYNAMIC TRANSPARENCY ADJUSTMENT OF USER INTERFACE ELEMENT

BACKGROUND

Field of Disclosure

This disclosure relates to the field of displaying information via a graphical user interface, and specifically to dynamically adjusting a graphical user interface element to enhance visibility.

Description of the Related Art

Many users utilize their digital devices to read material such as novels, news articles, short stories, etc., view videos, view pictures, or more generally interact with some sort of displayed content. Oftentimes the digital devices display a graphical user interface element of a user interface overlaid over a portion of the displayed content. The graphical user interface may have a transparent background that allows portions of the displayed content to be seen through the element. However, a transparent background is not always an option. For example, a transparent background can make it difficult to view the content of the element if the colors of the element are close to that of the overlaid content.

SUMMARY

The above and other needs are met by a computer-implemented method, a non-transitory computer-readable storage medium storing executable code, and a system for increasing visibility of components of a user interface element.

One embodiment of the computer-implemented method for dynamically adjusting one or more portions of a user interface (UI) element, comprises detecting content color data describing the color of content that is overlaid by a UI element on a display of a user device, the UI element including one or more components and a UI element background. Component color data describing the color of the one or more components of the UI element is determined. Transparency data is dynamically determined for the UI element background using the content color data and the component color data, and the UI element is displayed in accordance with the transparency data and the component color data.

In another embodiment a non-transitory computer-readable storage medium storing executable computer program instructions for dynamically adjusting one or more portions of a user interface (UI) element, comprises detecting content color data describing the color of content that is overlaid by a UI element on a display of a user device, the UI element including one or more components and a UI element background. Component color data describing the color of the one or more components of the UI element is determined. Transparency data is dynamically determined for the UI element background using the content color data and the component color data, and the UI element is displayed in accordance with the transparency data and the component color data.

In yet another embodiment a system for dynamically adjusting one or more portions of a user interface (UI) element, comprises a processor configured to execute modules, and a memory storing the modules. The modules include a content color detection module 410 configured to detect content color data describing the color of content that is overlaid by a UI element on a display of a user device, the UI element including one or more components and a UI element background. The modules also include a UI color detection module configured to determine component color data describing the color of the one or more components of the UI element. The modules also include a color analysis module configured to dynamically determine transparency data for the UI element background using the content color data and the component color data. The modules also include a display interface module configured to display the UI element in accordance with the transparency data and the component color data.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
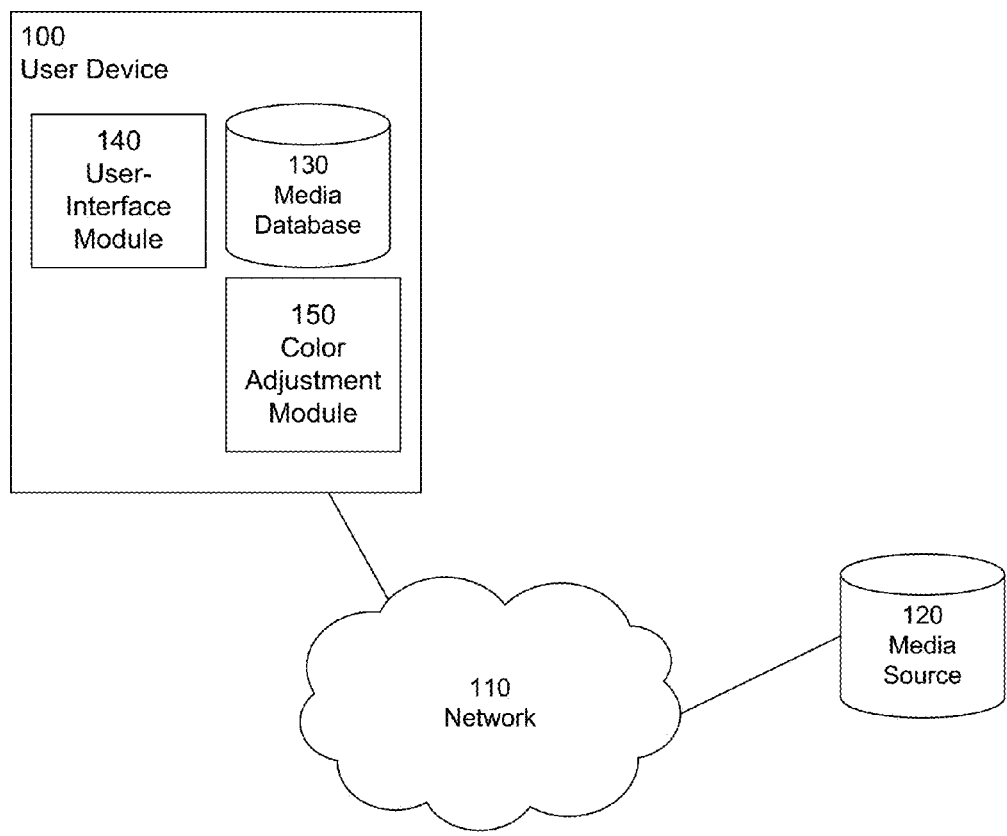
FIG. 1 is a high-level block diagram illustrating an embodiment of an environment for increasing visibility of components of a user interface element.

FIG. 1 is a high-level block diagram illustrating an embodiment of an environment for increasing visibility of components of a user interface element. The environment includes a user device 100 connected by a network 110 to a media source 120. Here only one user device 100 and media source 120 are illustrated but there may be multiple instances of each of these entities. For example, there may be thousands or millions of user devices 100 in communication with multiple media sources 120.

The network 110 provides a communication infrastructure between the user devices 100 and the media sources 120. The network 110 is typically the Internet, but may be any network, including but not limited to a Local Area Network (LAN), a Metropolitan Area Network (MAN), a Wide Area Network (WAN), a mobile wired or wireless network, a private network, or a virtual private network.

The user devices 100 are computing devices that execute computer program modules—e.g., a web browser or other client application—which allow a user to view ebooks, newsfeeds, browse the internet, and generally consume media content. A user device 100 might be, for example, a personal computer, a tablet computer, a smart phone, a laptop computer, GOOGLE GLASS®, a dedicated e-reader, or other type of network-capable device such as a networked television or set-top box.

The media source 120 includes one or more computer servers that provide media content to the user devices 100. Media content (henceforth referred to as content) is information that may be displayed to a user via a user device 100. For example, content may include an ebook, a video, an image, a newsfeed, a news article, some other content for display to a user, or some combination thereof. The media source 120 may directly provide content to the user clients 100 via the network 110.

A user device 100 comprises a media database 130, user interface module 140, and a color adjustment module 150 in one embodiment. In one embodiment these entities are software application modules executing on the user device 100. For example, the modules 130, 140, and 150 may be integrated into a smart phone application executing on a smart phone.

The user interface module 140 enables a user operating the user device 100 to request content from the media database 130 and/or the media source 120. The user interface module 140 also enables the user operating the user device 100 to view the requested content. For example, the user operating the user device 100 may select an ebook to read from a list of ebook choices displayed via the user interface module 140, and the user interface module 140 then sends a request for the selected ebook to the media source 120.

The user interface module 140 displays the requested content to the user. Additionally, the user interface module 140 is configured to scroll the displayed content in response to input received from the user.

The user interface module 140 displays one or more user interface (UI) elements that overlay portions of the displayed content. A UI element is a portion of the user interface that is displayed to the user in conjunction with displayed content. A UI element may be, for example, an action bar, a menu, a window, or some other graphical element displayed to the user. A UI element includes one or more components with fixed color data, and a background portion with variable color data. The components may be, for example, text, icons, or some combination thereof. In one embodiment, the background of the UI element, or portions thereof, has variable color data.

The user interface module 140 renders content and/or the UI element in accordance with associated color data. Color data describes how content and the UI element is to be rendered on the user device 100. Portions of color data may be fixed (i.e., fixed color data), variable (i.e., variable color data), or some combination thereof. Fixed color data is color data causes portions of the associated UI element and/or portions of content to be displayed using specified colors. In contrast, variable color data may be adjusted prior to and/or during display of the associated portions of the UI element. Color data may be used to describe in the color of the content in different color spaces. Color spaces may include, for example, HSL (i.e., hue, saturation, lightness), HSV (i.e., hue, saturation, value), RGB (i.e., red, green, blue), any other color space, or some combination thereof.

The user interface module 140 is configured to display some or all of the background associated with the UI element in accordance with transparency data received from the color adjustment module 150. Additionally, the user interface module 140 is configured to dynamically vary the transparency of the background of the UI element in real time based on the transparency data.

The media database 130 stores content and information relating to content. Information relating to content includes, for example, color data, metadata associated with the content, or some combination thereof. The metadata describes different aspects of the content. The metadata may comprise, for example, author, date of publishing, reviews, genre information, publisher, ratings, a media item identifier etc.

The color adjustment module 150 dynamically adjusts one or more transparency levels of a background associated with a UI element that overlays, or is to overlay, a portion of displayed content. The color adjustment module 150 generates transparency data, that controls the one or more transparency levels associated with the background of the UI element, using the color data associated with the UI element and the color data associated with the content. The color adjustment module 150 adjusts the transparency level to display, partially display, or block the content behind the UI element based on an estimation of the visibility of components (e.g., text and/or icons) when some or all of the UI element background is fully transparent. For example, if the components include text that is predominately white, the UI element background is fully transparent, and the overlaid content is white, there would be no contrast between the components and overlaid content, thus negatively impacting the visibility of the components. The color adjustment module 150 is configured to adjust the level of transparency associated with the background of the UI element toward becoming opaque, and possibly fully opaque. Thereby increasing the visibility of the components. The color adjustment module 150 is configured to provide transparency data, color data associated with the content, color data associated with the UI element, or some combination thereof, to the user interface module 140.

Additionally, the color adjustment module 150 is configured to dynamically adjust the background of the UI element based on changes to content overlaid by the UI element, changes in the fixed color data of the components, or some combination thereof. Continuing with the above example, if a user scrolls the content such that the portion of the content overlaid by the UI element is dark enough to have good visibility (e.g., high contrast with the components), the color adjustment module 150 may adjust the level of transparency of the background of the UI element toward becoming fully transparent, and possibly fully transparent. Thereby increasing the visibility of the overlaid content to the user.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figures 2A, 2B:
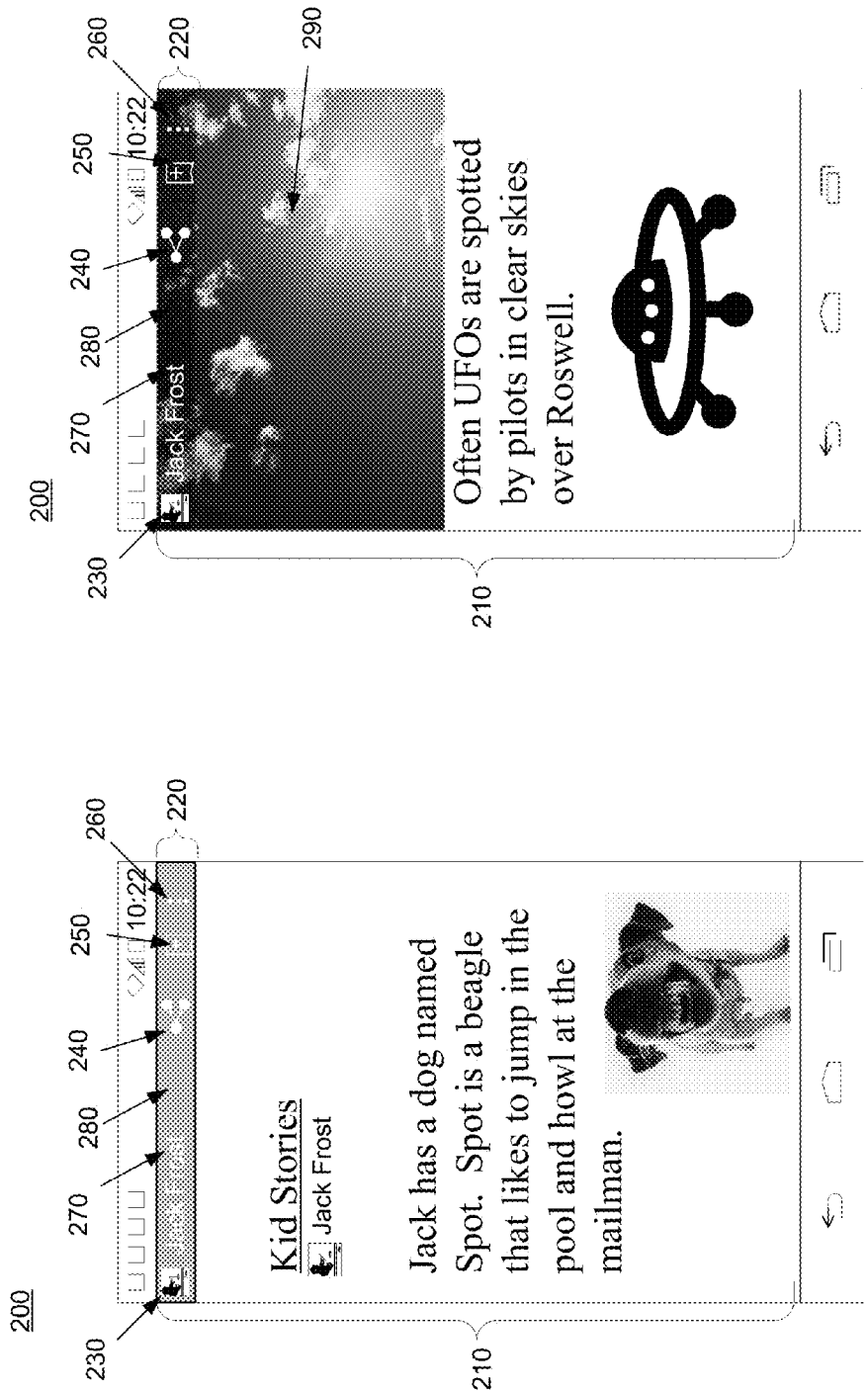
FIG. 2A illustrates an example of a user interface displayed by a user device showing an opaque action bar according to an embodiment.
FIG. 2B illustrates an example of the user interface of FIG. 2A showing a partially transparent action bar according to an embodiment.

FIG. 2A illustrates an example of a user interface 200 displayed by a user device 100 showing an opaque action bar according to an embodiment. The user interface 200 includes a displayed area 210 that displays content in accordance with its associated color data. The user interface 200 includes an action bar 220 that overlays a portion of the displayed area 210.

The action bar 220 includes multiple components having their own respective fixed color data. In this example, components include icons 230, 240, 250, and 260, and text 270. In this example icons 240, 250, and 260 and text 270 are associated with color data that causes them to be rendered white, and icon 230 is associated with color data that causes it to be rendered in a combination of black and white.

The action bar 220 includes a background area 280. The overlaid portion of the displayed area 210 would be displayed as white if it were not overlaid by the action bar 220, which would negatively impact the visibility of the components. Accordingly, the user interface 200 dynamically adjusts variable color data associated with the background area 280 such that it is displayed opaque (e.g., in this case grey) to increase visibility of the icons 230, 240, 250, and 260, and the text 270 within the action bar 220. In contrast, if the user interface 200 were to display the action bar as fully transparent or partially transparent there would be little or no contrast between the icons 230, 240, 250, and 260, and the text 270 and the color (i.e., in this case white) of overlaid portion of the displayed area 210.

FIG. 2B illustrates an example of the user interface 200 of FIG. 2A showing a partially transparent action bar according to an embodiment. The displayed area 210 displays content that includes an image 290 that is partially overlaid by the action bar 220. The user interface 200 dynamically adjusts variable color data associated with the background area 280 such that the background area 280 is partially transparent to increase visibility of the icons 230, 240, 250, and 260, and the text 270 within the action bar 220, and increase the amount of content visible to a user in the displayed area 210. In contrast, if the user interface 200 were to display the action bar as fully transparent, in this example, there would be less contrast between the icons 230, 240, 250, and 260, and the text 270 and the colors of overlaid portion of the displayed area 210. And, if the user interface 200 were to display the action bar as fully opaque while contrast may be increased, the action bar 220 would reduce the amount of displayed content and possibly cause the action bar 220 to be more intrusive to a user. The determination of how transparent to make the background area 280 is discussed below in detail with reference to FIGS. 4 and 5.

Figure 3:
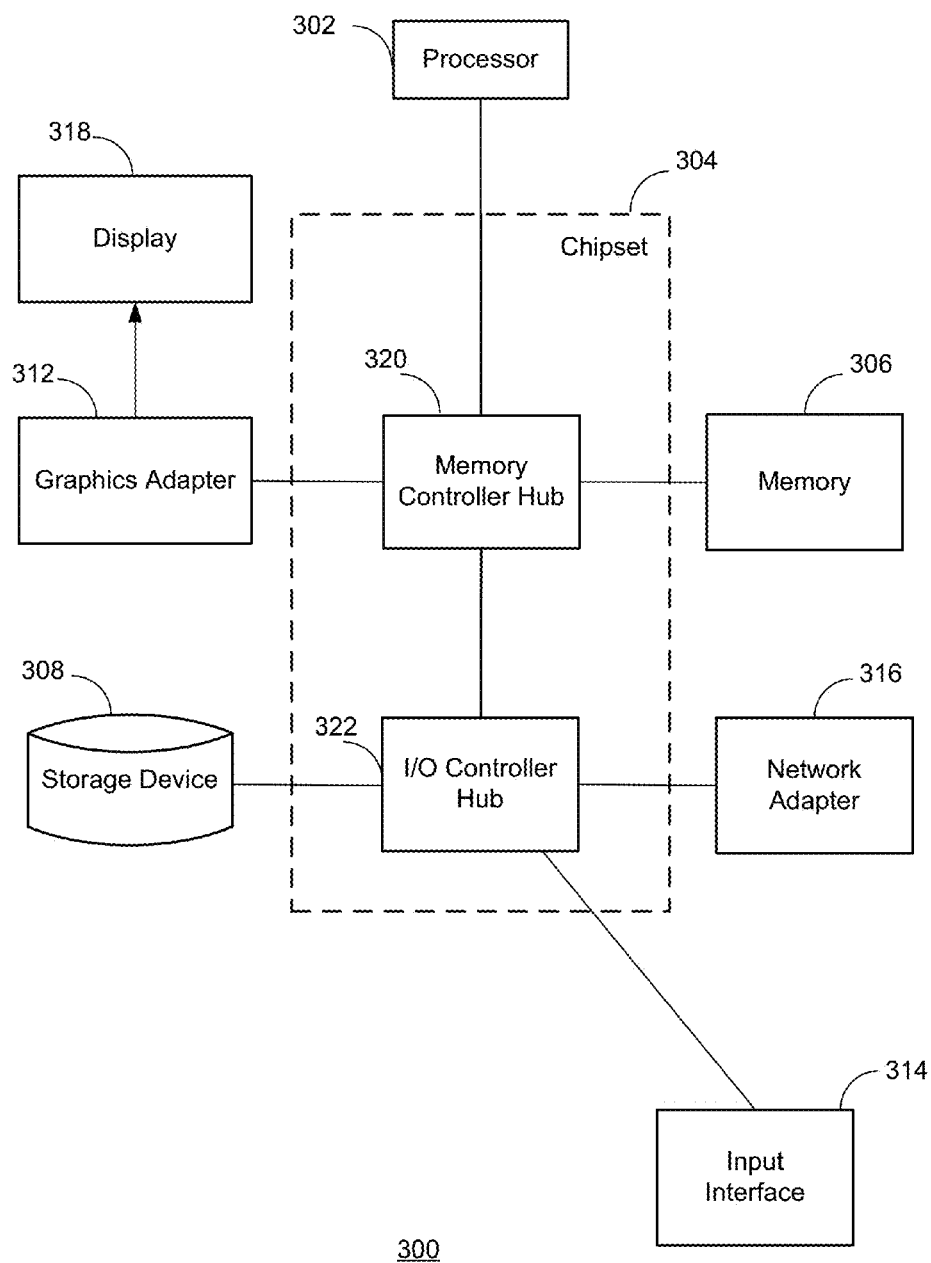
FIG. 3 is a high-level block diagram illustrating an example computer for implementing the entities shown in FIG. 1.

Turning now to a discussion of the implementation of the dynamic transparency adjustment of portions of a UI element discussed above, FIG. 3 is a high-level block diagram illustrating an example computer 300 for implementing the entities shown in FIG. 1. The computer 300 includes at least one processor 302 coupled to a chipset 304. The chipset 304 includes a memory controller hub 320 and an input/output (I/O) controller hub 322. A memory 306 and a graphics adapter 312 are coupled to the memory controller hub 320, and a display 318 is coupled to the graphics adapter 312. A storage device 308, an input interface 314, and network adapter 316 are coupled to the I/O controller hub 322. Other embodiments of the computer 300 have different architectures.

The storage device 308 is a non-transitory computer-readable storage medium such as a hard drive, compact disk read-only memory (CD-ROM), DVD, or a solid-state memory device. The memory 306 holds instructions and data used by the processor 302. The input interface 314 is a mouse, track ball, some other type of pointing device, a keyboard, or some combination thereof, and is used to input data into the computer 300. The graphics adapter 312 displays images and other information on the display 318. The network adapter 316 couples the computer 300 to one or more computer networks.

The computer 300 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 308, loaded into the memory 306, and executed by the processor 302.

The types of computers 300 used by the entities of FIG. 1 can vary depending upon the embodiment and the processing power required by the entity. For example, the user device 300 may interact with one or more servers working together to provide the functionality described herein. The computers 300 can lack some of the components described above, such as keyboards, graphics adapters 312, and displays 318.

Figure 4:
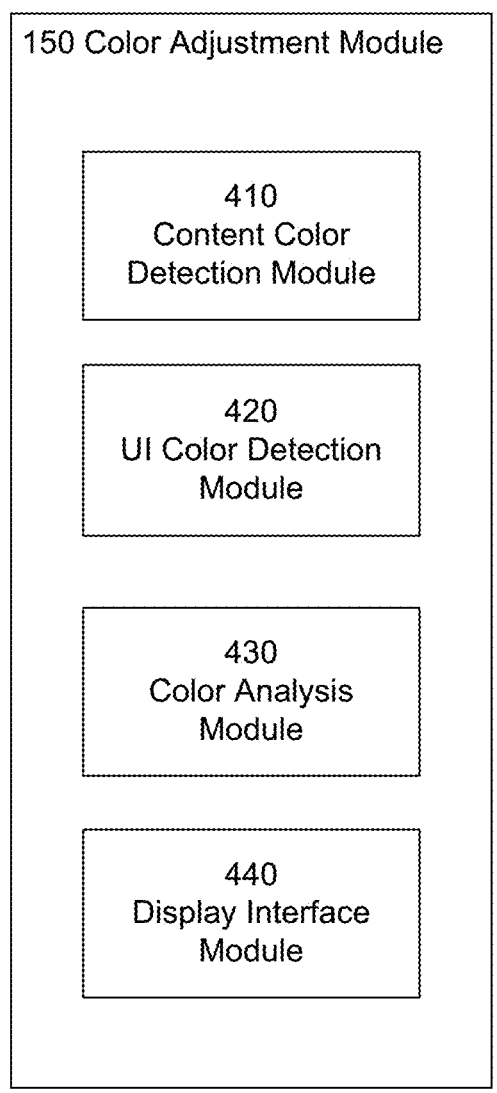
FIG. 4 is a high-level block diagram illustrating a detailed view of modules within a color adjustment module of a user device according to one embodiment.

FIG. 4 is a high-level block diagram illustrating a detailed view of modules within the color adjustment module 150 of a user device 100 according to one embodiment. Some embodiments of the color adjustment module 150 have different modules than those described here. Similarly, the functions can be distributed among the modules in a different manner than is described here. The color adjustment module 150 is comprised of modules including a content color detection module 410, a user interface (UI) color detection module 420, a color analysis module 430, and a display interface module 440.

The content color detection module 410 detects content color data of a portion of content that is to be overlaid with a UI element. First, the content color detection module 410 determines what portion of the content is to be overlaid with a UI element. The content color detection module 410 then extracts color data from the portion of content to be overlaid with the UI element. The extracted color data may be in HSL, HSV, RGB, or in some other color space. Additionally, in some embodiments, the content color detection module 410 is configured to detect content color data for all of the content that is to be rendered in a display area (e.g., display area 210). The content color detection module 410 is configured to pass the content color data (or portions thereof) to the color analysis module 430 and the display interface module 440.

In some embodiments, the content color detection module 410 dynamically monitors the overlaid content and extracts color data from the overlaid content in real time. Alternatively, in some embodiments, the content color detection module 410 dynamically extracts color data associated with the overlaid content if the overlaid content changes (e.g., load of a new page, user scrolls page, etc.). The content color detection module 410 may detect the color data associated with overlaid content prior to display of the overlaid content or during the display of overlaid content.

In some embodiments, the content color detection module 410 may extract color data from the content on a pixel by pixel basis. In other embodiments, the content color detection module 410 may extract color data from an under-sampled version of the overlaid content. For example, the content color detection module 410 may extract color data from every third pixel of the content. The amount of under-sampling may be determined by the content color detection module 410, a user, or both.

The UI color detection module 420 is configured to determine fixed color data associated with one or more components of the UI element. The UI color detection module 420 extracts fixed color data from one or more components within the UI element. The extracted color data may be in HSL, HSV, RGB, or in some other color space. In some embodiments, the UI color detection module 420 is configured to determine fixed color data for each of the components overlaying content. Alternatively, the UI color detection module 420 is configured to determine an average combination, or some other combination, of the fixed color data for all of the components overlaying content. The UI color detection module 420 is configured to pass the fixed color data to the color analysis module 430 and the display interface module 440.

In some embodiments, the UI color detection module 420 monitors the components and dynamically extracts fixed color data from the components. Alternatively, in some embodiments, the UI color detection module 420 extracts fixed color data associated with the components if the components change (e.g., color change, new component added, etc.). The UI color detection module 420 may detect the fixed color data associated with the components prior to display of the components or during the display of components.

In some embodiments, the UI color detection module 420 may extract fixed color data from the components on a pixel by pixel basis. In other embodiments, the UI color detection module 420 may extract fixed color data from an under-sampled version of the components. The amount of under-sampling may be determined by the content color detection module 410, a user, or both.

The color analysis module 430 determines how transparent to make a UI element background based in part on the content overlaid by the UI element. The color analysis module 430 analyzes the color of the content in association with the color of the overlaying UI elements to determine the transparency of the background. In one embodiment, the color analysis module 430 estimates the visibility of components (e.g., text and/or icons) of the UI elements to a user of the user device 100 by comparing color parameters of the overlaid content with the fixed color data of the UI element. The color analysis module 430 dynamically adjusts the transparency of the UI element background based on this analysis in a manner that enhances the visibility of the components of the UI element.

More specifically, the color analysis module 430 determines one or more color parameters that are associated with the color data received from the content color detection module 410. A color parameter may be, for example, an average color of the content or portions thereof, a median color of the content or portions thereof, a peak color (i.e., the maximum values of the pixels for a given measurement on those pixels) of the content or portions thereof, a minimum color (i.e., the minimum values of the pixels for a given measurement on those pixels) of the content or portions thereof, or some combination thereof. Each color parameter may be described in a color space (e.g., HSL, HSV, RGB, etc.).

The color analysis module 430 compares the one or more color parameters to the fixed color data of the UI element to determine one or estimated visibility values. An estimated visibility value is an estimate of how visible a component is to a user in view of the overlaid content. In embodiments where the color data is described via HSL (or, e.g., HSV), an estimated visibility value is a difference in like color components (e.g., hue, saturation, lightness (i.e., brightness)) of the content (or a portion thereof) and the fixed color data. For example, in HSL space, estimated visibility values may include an estimated hue value (e.g., estimated hue value=hue of content−hue of fixed color value), an estimated saturation value (e.g., estimated saturation value=saturation of content−saturation of fixed color value), an estimated brightness value (e.g., estimated brightness value=brightness of content−brightness of fixed color value), or some combination thereof. For example, if the average color of the background content is white, and the fixed color data of the components are white, the visibility component for the content and the components would be the same, resulting in a low estimated contrast value for each of the components.

In some embodiments, the color analysis module 430 converts the color space of the color data associated with the UI element, the content, or both, to HSL, HSV, or some other color space where contrast can be determined by taking the difference of two color components of a like color space. Alternatively, in some embodiments, visibility values may be determined in RGB color space using known methods.

The color analysis module 430 determines transparency data for the UI element background, or a portion thereof, using the one or more estimated visibility values. In some embodiments, the color analysis module 430 includes a look up table that maps one or more estimated visibility values to associated transparency data for the UI element background and/or portions thereof. For example, given one or more visibility values, the color analysis module 430 may determine a level of transparency from the look up table. In general, as the level of contrast between the components of the UI element and the overlaid content (e.g., estimated brightness value) increases, the level of transparency also increases. For example, a high contrast is associated with a high level of transparency.

Transparency data describes one or more levels of transparency associated with some or all of the background of a UI element to be rendered on the user device 100 in association with displayed content, or portions thereof. A level of transparency may vary between fully transparent to fully opaque. In some embodiments, the levels of transparency vary in a continuous manner between fully transparent and fully opaque. In other embodiments, the levels of transparency vary in a stepped manner from fully opaque, to one or more levels of partial transparency, to fully transparent. Partially transparent refers to any transparency level between fully transparent and fully opaque. Partial transparency may be obtained by adding a color level (e.g., gray, black, etc.) to some or all of the background of the UI element. As the level of transparency decreases, the amount of the added color level increases, and conversely as the level of transparency increases, the amount of the added color level decreases. Transparency data may be associated with some or all of the background of the UI element. For example, a portion of the UI element background may have one transparency level, while another portion of the UI element background may have a different transparency level.

In some embodiments the relationship between the estimated visibility values and the level of transparency is continuous such that the level of transparency varies depending on the estimated visibility values. Accordingly, in these embodiments, there is a continuous range of transparency levels.

In other embodiments, the relationship between the estimated visibility values and the level of transparency is stepped. For example, assuming that the components of a UI element are white (i.e., brightness of fixed color value near 1, on scale from 0 to 1), if the estimated brightness value (i.e., brightness of content-brightness of fixed color value) is less than 0.15 (on a 0 to 1 scale) and the estimated saturation value (i.e., saturation of content-saturation of fixed color value) is less than 0.1 (on a 0 to 1 scale) the contrast is low, and the transparency data is such that the background of the UI element (or portion thereof) is displayed opaque. This may occur, for example, if the overlaid content was also white or some color close to white (e.g., cream, ivory, etc.) that would also have a visibility close to 1. If the estimated brightness value ranges from 0.15 and 0.35 and the estimated saturation value ranges from 0.11 to 0.29, the contrast is mid-range, and the transparency data is such that the background of the UI element is partially transparent (e.g., 50% transparency). And if the estimated brightness value is greater than 0.35 and the estimated saturation value is greater than 0.29, there is high contrast, and the transparency data is such that the background of the UI element (or portion thereof) is fully transparent. Thus, resulting in distinct steps in the amount of transparency, depending on the estimated visibility values. The color analysis module 430 is configured to provide the transparency data to the display interface module 440.

In some embodiments, the color analysis module 430 is configured to provide a single transparency level that is constant throughout the associated UI element background (e.g., same level of transparency everywhere in the UI background). In other embodiments, multiple transparency levels are concurrently used resulting in a gradient in the transparency level. A gradient in the transparency levels removes abrupt changes between how the non-overlaid content bordering the UI element and content displayed through the UI element is displayed.

In some embodiments, the color analysis module 430 is configured to perform a spatial frequency analysis on some or all of the content, and/or some or all of the UI element. The spatial frequency analysis may be used to, for example, detect if the overlaid content has characteristics that are close to the spatial frequency characteristics of some, or all, of the UI element. For example, if the UI element includes text, and the overlaid content consists primarily of text, the spatial frequency characteristics of the UI element and the overlaid content may be close in value. The color analysis module 420 may automatically set some or all of the background of the UI element as opaque if the spatial frequency analysis value indicates that the overlaid content has characteristics that are close to the spatial characteristics of some, or all, of the UI element.

In some embodiments, the color analysis module 430 may determine the transparency data using an in-memory buffer and the under sampled content color data received from the content color detection module 410. Thus increasing the response time of the color analysis module 430 in determining the transparency data when compared to a pixel by pixel calculation.

The display interface module 440 is configured to provide to the user interface module 140 the transparency data to facilitate display of the UI element. Additionally, in some embodiments, the display interface module 440 is configured to provide color data associated with the UI element, color data associated with the content, or some combination thereof, to the user interface module 140.

In some embodiments, the display interface module 440 may be the user interface module 140. Thus, the display interface module 440 may display the UI element in accordance with the transparency data and the component color data. Moreover, the display interface module 440 may dynamically adjust the transparency of the background of the UI element in response to changes in the transparency data.

Figure 5:
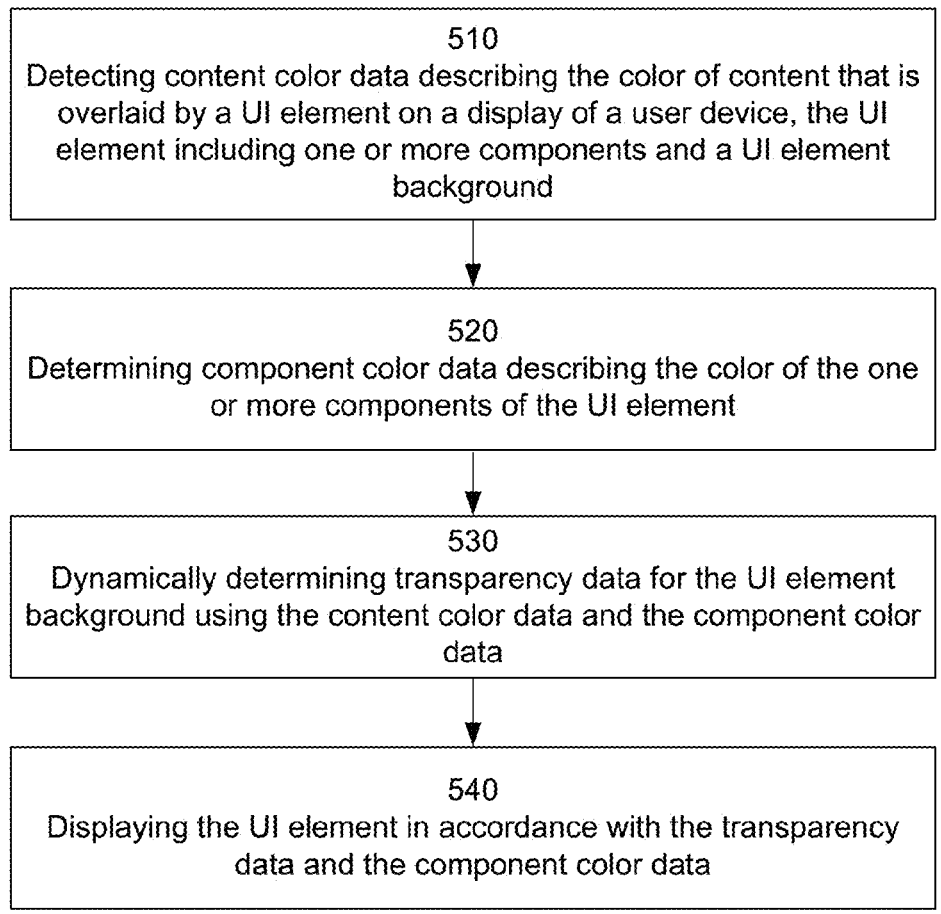
FIG. 5 is a flowchart illustrating a process of determining a transparency level for a background of a user interface element according to one embodiment.

FIG. 5 is a flowchart illustrating a process of determining a transparency level for a background of a UI element according to one embodiment. In one embodiment, the process of FIG. 5 is performed by the user device 100. Other entities may perform some or all of the steps of the process in other embodiments. Likewise, embodiments may include different and/or additional steps, or perform the steps in different orders.

The user device 100 detects 510 content color data describing the color of content that is overlaid by a UI element on a display of a user device, the UI element including one or more components and a UI element background. The user device 100 determines 520 component color data describing the color of the one or more components of the UI element. Some or all of the component color data is fixed color data.

The user device 100 dynamically determines 530 transparency data for the UI element background, or a portion thereof, using the content color data and the component color data. The user device 100 may determine one or more color parameters using the content color data. The user device 100 may then determine one or more estimated visibility values using the one or more color parameters and the component color data. The user device 100 may then determine the transparency data for UI element background (or portion thereof) based on the one or more estimated visibility values.

The user device 100 then displays 540 the UI element in accordance with the transparency data and the component color data.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for automated dictionary generation. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method for dynamically adjusting one or more portions of a user interface (UI) element, comprising:
   detecting, by a processor, content color data describing the color of content that is overlaid by a UI element on a display of a user device, the UI element including one or more components and a UI element background;
   determining, by the processor, component color data describing the color of the one or more components of the UI element, the component color data fixed such that one or more components of the UI element are displayed as specified by the component color data;
   dynamically determining, by the processor, transparency data for the UI element background using the content color data and the component color data;
   displaying the UI element in accordance with the transparency data and the component color data; and
   responsive to detecting change in content color data,
      dynamically determining, by the processor, adjusted transparency data for the UI element background using the change in the content color data and the component color data, the adjusted transparency data controlling a transparency level of the UI element background, the transparency level selected from a plurality of transparency levels ranging from transparent to opaque, and
      displaying the UI element in accordance with the adjusted transparency data and the component color data.

2. The computer-implemented method of claim 1, further comprising:
   under-sampling the content color data;
   under-sampling the component color data associated with one or more components of the UI element, and
   wherein the transparency data is determined using the under-sampled content color data and the under-sampled component color data.

3. The computer-implemented method of claim 1, wherein dynamically determining, by the processor, transparency data for the UI element background using the content color data and the component color data comprises:
   determining a color parameter based on the content color data associated with the portion of content overlaid by the UI element;
   determining an estimated visibility value using the color parameter and the component color data associated with the one or more components of the UI element; and
   determining one or more transparency levels, of the plurality of transparency levels, based on the estimated visibility value.

4. The computer-implemented method of claim 3, wherein determining an estimated visibility value using the color parameter and the component color data associated with the one or more components of the UI element comprises:
   calculating a difference in a color component associated with the content color data and a like color component associated with the component color data.

5. The computer-implemented method of claim 1, further comprising:
   converting the content color data or the component color data such that they are in the same color space.

6. The computer-implemented method of claim 1, further comprising:
   performing a spatial frequency analysis of the content that indicates the overlaid content is primarily text; and
   setting a transparency level, of the plurality of transparency levels, associated with the background of the UI element to opaque based on the results of the spatial frequency analyses.

7. The computer-implemented method of claim 1, wherein dynamically determining, by the processor, adjusted transparency data for the UI element background using the change in the content color data and the component color data, further comprises:
   determining that the change in the content color data increases contrast between the changed content color data and the component color data; and
   responsive to the determining, increasing the level of transparency of the UI element background.

8. The computer-implemented method of claim 1, wherein dynamically determining, by the processor, adjusted transparency data for the UI element background using the change in the content color data and the component color data, further comprises:
   determining that the change in the content color data reduces contrast between the changed content color data and the component color data; and
   responsive to the determining, reducing the level of transparency of the UI element background.

9. A non-transitory computer-readable storage medium storing executable computer program instructions for dynamically adjusting one or more portions of a user interface (UI) element, the instructions executable to perform steps comprising:
   detecting, by a processor, content color data describing the color of content that is overlaid by a UI element on a display of a user device, the UI element including one or more components and a UI element background;

determining, by the processor, component color data describing the color of the one or more components of the UI element, the component color data fixed such that one or more components of the UI element are displayed as specified by the component color data;

dynamically determining, by the processor, transparency data for the UI element background using the content color data and the component color data;

displaying the UI element in accordance with the transparency data and the component color data; and responsive to detecting a change in content color data,
dynamically determining, by the processor, adjusted transparency data for the UI element background using the change in the content color data and the component color data, the adjusted transparency data controlling a transparency level of the UI element background, the transparency level selected from a plurality of transparency levels ranging from transparent to opaque, and displaying the UI element in accordance with the adjusted transparency data and the component color data.

10. The computer-readable medium of claim 9, further comprising:

under-sampling the content color data;

under-sampling the component color data associated with one or more components of the UI element, and wherein the transparency data is determined using the under-sampled content color data and the under-sampled component color data.

11. The computer-readable medium of claim 9, wherein dynamically determining, by the processor, transparency data for the UI element background using the content color data and the component color data comprises:

determining a color parameter based on the content color data associated with the portion of content overlaid by the UI element;

determining an estimated visibility value using the color parameter and the component color data associated with the one or more components of the UI element; and determining one or more transparency levels, of the plurality of transparency levels, based on the estimated visibility value.

12. The computer-readable medium of claim 11, wherein determining an estimated visibility value using the color parameter and the component color data associated with the one or more components of the UI element comprises:

calculating a difference in a color component associated with the content color data and a like color component associated with the component color data.

13. The computer-readable medium of claim 9, further comprising:

converting the content color data or the component color data such that they are in the same color space.

14. The computer-readable medium of claim 9, further comprising:

performing a spatial frequency analysis of the content that indicates the overlaid content is primarily text; and setting a transparency level, of the plurality of transparency levels, associated with the background of the UI element to opaque based on the results of the spatial frequency analyses.

15. A system for dynamically adjusting one or more portions of a user interface (UI) element, comprising:

a processor; and a memory storing the modules that are executed by the processor, the modules comprising:

a content color detection module that detects content color data describing the color of content that is overlaid by a UI element on a display of a user device, the UI element including one or more components and a UI element background; and a UI color detection module that determines component color data describing the color of the one or more components of the UI element, the component color data fixed such that one or more components of the UI element are displayed as specified by the component color data; and a color analysis module that dynamically determines transparency data for the UI element background using the content color data and the component color data; and a display interface module that displays the UI element in accordance with the transparency data and the component color data, and wherein, responsive to the content color detection module detecting a change in content color data, the color analysis module determines adjusted transparency data for the UI element background using the change in the content color data and the component color data, the adjusted transparency data controlling a transparency level of the UI element background, the transparency level selected from a plurality of transparency levels ranging from transparent to opaque, and the display interface module displays the UI element in accordance with the adjusted transparency data and the component color data.

16. The system of claim 15, wherein the content color detection module under-samples the content color data, the UI color detection module under-samples the component color data associated with one or more components of the UI element, and wherein the transparency data is determined by the color analysis module using the under-sampled content color data and the under-sampled component color data.

17. The system of claim 15, wherein the color analysis module:

determines a color parameter based on the content color data associated with the portion of content overlaid by the UI element;

determines an estimated visibility value using the color parameter and the component color data associated with the one or more components of the UI element; and determines one or more transparency levels, of the plurality of transparency levels, based on the estimated visibility value.

18. The system of claim 17, wherein the color analysis module calculates a difference in a color component associated with the content color data and a like color component associated with the component color data.

19. The system of claim 15, wherein the color analysis module converts the content color data or the component color data such that they are in the same color space.

* * * * *